United States Patent
Park et al.

(10) Patent No.: US 9,000,677 B2
(45) Date of Patent: Apr. 7, 2015

(54) LIGHT EMITTING DIODE DRIVING APPARATUS

(71) Applicant: Samsung Electro-Mechanics Co., Ltd., Suwon, Gyunggi-do (KR)

(72) Inventors: Jung Eui Park, Gyunggi-do (KR); Seung Kon Kong, Gyunggi-do (KR); Seo Hyung Kim, Gyunggi-do (KR); Bo Hyun Hwang, Gyunggi-do (KR); Jae Shin Lee, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 16 days.

(21) Appl. No.: 13/763,985

(22) Filed: Feb. 11, 2013

(65) Prior Publication Data

US 2014/0139131 A1    May 22, 2014

(30) Foreign Application Priority Data

Nov. 20, 2012  (KR) .......................... 10-2012-0131931

(51) Int. Cl.
  *H05B 37/02* (2006.01)
  *H05B 33/08* (2006.01)

(52) U.S. Cl.
  CPC ........ *H05B 33/0818* (2013.01); *H05B 33/0827* (2013.01); *H05B 33/0845* (2013.01)

(58) Field of Classification Search
  CPC ............................... H05B 37/00; H05B 37/02
  USPC .......................... 315/291, 294, 297, 210, 224
  See application file for complete search history.

(56) References Cited

U.S. PATENT DOCUMENTS

| 2010/0134040 A1* | 6/2010 | Elder ............................ 315/294 |
| 2011/0309758 A1* | 12/2011 | Yu et al. ........................ 315/192 |
| 2012/0019160 A1* | 1/2012 | Lee et al. ...................... 315/291 |
| 2012/0201019 A1 | 8/2012 | Chung et al. |

FOREIGN PATENT DOCUMENTS

| JP | 2012-124003 | * | 6/2012 |
| KR | 10-2012-0076966 A | | 7/2012 |
| KR | 10-2012-0090330 A | | 8/2012 |

OTHER PUBLICATIONS

Korean Office Action issued in corresponding Korean Application No. 10-2012-0131931, dated Mar. 31, 2014, with English translation.
Notice of Office Action Korean Patent Application No. 10-2012-0131931 dated Sep. 30, 2014 with full English translation.

* cited by examiner

*Primary Examiner* — Tung X Le
*Assistant Examiner* — Jonathan Cooper
(74) *Attorney, Agent, or Firm* — McDermott Will & Emery LLP

(57) ABSTRACT

There is provided a light emitting diode driving apparatus, including: a power supplying unit converting input power into driving power according to a control and supplying the converted driving power to a light emitting diode channel; a driving unit controlling current flowing in the light emitting diode channel according to a pulse width modulation (PWM) dimming signal from the outside; and a controlling unit comparing a reference level set by a duty of the PWM dimming signal with a detection voltage level of the light emitting diode channel and controlling a power converting operation of the power supplying unit according to the comparison result.

6 Claims, 3 Drawing Sheets

LIGHT EMITTING DIODE DRIVING APPARATUS

CROSS-REFERENCE TO RELATED APPLICATIONS

This application claims the priority of Korean Patent Application No. 10-2012-0131931 filed on Nov. 20, 2012, in the Korean Intellectual Property Office, the disclosure of which is incorporated herein by reference.

BACKGROUND OF THE INVENTION

1. Field of the Invention

The present invention relates to a light emitting diode driving apparatus capable of stably controlling an output voltage supplied to a light emitting diode (LED) channel.

2. Description of the Related Art

Recently, interest in and demand for light emitting diodes (LEDs) have increased.

A device using a light emitting diode may be manufactured to have a compact form, such that it may even be used in a place in which it is difficult to install an existing electronic product. In the case in which the light emitting diode is used as a lighting device, various colors and degrees of luminance may easily be implemented therein, such that it may be used in a lighting system appropriate for an activity such as watching movies, reading books, conferencing, and the like.

In addition, the light emitting diode consumes an amount of power corresponding to approximately ⅛ of that consumed by an incandescent lamp, has a lifespan of fifty thousand to one hundred thousand hours, approximately 5 to 10 times that of an incandescent lamp, is environmentally-friendly as a mercury free light source, and may be variously implemented.

Due to these characteristics, light emitting diode lighting projects has been promoted in government-sponsored projects in many countries such as South Korea, the United States of America, Japan and Australia.

Further, in accordance with the recent development of flat panel display technology, a flat panel display has been used in automobile instrument panels as well as in smart phones, game devices, and digital cameras. In the future, a range of applications of flat panel displays will be increased to be included in devices used in everyday life such as micro-thin televisions, transparent navigation devices, and the like.

Further, in the current display market, new flat panel displays (FPDs) reflecting multimedia requirements such as a high resolution, large screen sizes and the like, have been prominent. Particularly, in the case of large displays, a consumer uptake rate of liquid crystal display (LCD) televisions has rapidly grown, such that it is expected that LCD televisions will dominate the market for televisions in view of the price and marketability thereof.

A thin film transistor liquid crystal display (TFT-LCD) is mainly used as a flat panel display.

TFT-LCDs include a backlight unit emitting light and mainly use a cold cathode fluorescent lamp (CCFL) as a back light source. However, recently, a rate of LED usage therewith has increased, due to various advantages in terms of power consumption, lifespan, environmental friendliness, and the like.

Therefore, a relatively cheap electronics system for a backlight unit power module using an LED, and an appropriate control element therefor, have been urgently demanded.

As described above, the light emitting diode, the use of which has increased, requires a driving apparatus for driving the light emitting diode. According to the related art, a switching element has been used in order to control respective LED channels to have constant current therein. However, as described in the following Related Art Document, the LED channels are configured of a plurality of LEDs connected to each other in series, such that voltage deviations occur between the LEDs. As a result, a current imbalance between the LED channels may occur, thereby causing the diode driving apparatus to have non-uniform luminance.

In order to decrease power consumption and heat generation due to the above-mentioned current imbalance, voltage applied to a switch switching an operation of the LED channel is intended to be maintained as low a level as possible within a limit in which an abnormality does not occur in an LED driving current (the switch may operate in a saturation region). However, in a state in which a duty of a PWM dimming signal is low, the voltage applied to the switch is decreased to be equal to or lower than the limit to which the switch may operate in the saturation region, such that distortion may occur in the LED driving current and the LED driving current may have an unstable state, whereby it may not be easy to control a desired level of brightness.

RELATED ART DOCUMENT (Patent Document 1) U.S. Patent Application Publication No. 2011/0309758

SUMMARY OF THE INVENTION

An aspect of the present invention provides a light emitting diode (LED) driving apparatus capable of stably performing control of an output voltage by changing a reference level in the case in which a pulse width modulation (PWM) duty is low at the time of controlling PWM dimming of a LED channel.

According to an aspect of the present invention, there is provided a light emitting diode driving apparatus, including: a power supplying unit converting input power into driving power according to a control and supplying the converted driving power to a light emitting diode channel; a driving unit controlling current flowing in the light emitting diode channel according to a pulse width modulation (PWM) dimming signal from the outside; and a controlling unit comparing a reference level set by a duty of the PWM dimming signal with a detection voltage level of the light emitting diode channel and controlling a power converting operation of the power supplying unit according to the comparison result.

The controlling unit may change the reference level when the duty of the PWM dimming signal is equal to or shorter than a preset reference duty.

The controlling unit may include: a PWM duty sensing unit sensing the duty of the PWM dimming signal; a reference level changing unit changing the reference level when the duty of the PWM dimming signal sensed by the PWM duty sensing unit is shorter than a preset reference duty; a comparing unit comparing the reference level from the reference level changing unit with the detection voltage level of the light emitting diode channel; and a power controlling unit controlling the power converting operation of the power supplying unit according to the comparison result of the comparing unit.

The light emitting diode channel may include a plurality of light emitting diode channels connected to each other in parallel.

The controlling unit may further include a selecting unit selecting one of respective detection voltages of the plurality of light emitting diode channels.

The selecting unit may select a minimum detection voltage among the detection voltages of the plurality of light emitting diode channels.

The driving unit may include a plurality of drivers corresponding to the plurality of light emitting diode channels, respectively.

Each of the plurality of drivers may include: a switch connected between an end of the corresponding light emitting channel and a ground and controlling the current flowing in the light emitting diode channel according to a switching signal; and a comparator comparing the dimming signal from the outside with voltage obtained by detecting the current flowing in the switch and controlling a switching operation of the switch.

The PWM dimming signal may have on/off-duties applied when the switch is switched on.

The controlling unit may maintain an existing reference level when the duty of the PWM dimming signal is equal to or longer than the preset reference duty.

According to another aspect of the present invention, there is provided a light emitting diode driving apparatus, including: a power supplying unit converting input power into driving power according to control and supplying the converted driving power to each of a plurality of light emitting diode channels connected to each other in parallel; a driving unit controlling current flowing in the light emitting diode channels according to a pulse width modulation (PWM) dimming signal from the outside; and a controlling unit comparing a reference level set by a duty of the PWM dimming signal with a detection voltage level of the light emitting diode channel and controlling a power converting operation of the power supplying unit according to the comparison result.

The controlling unit may increase the reference level when the duty of the PWM dimming signal is shorter than a preset reference duty and maintain the reference level when the duty of the PWM dimming signal is equal to or longer than the preset reference duty.

The controlling unit may include: a PWM duty sensing unit sensing the duty of the PWM dimming signal; a reference level changing unit increasing the reference level when the duty of the PWM dimming signal sensed by the PWM duty sensing unit is shorter than the preset reference duty, and maintaining an existing reference level when the duty of the PWM dimming signal is equal to or longer than the preset reference duty; a comparing unit comparing the reference level from the reference level changing unit with the detection voltage level of the light emitting diode channel; and a power controlling unit controlling the power converting operation of the power supplying unit according to the comparison result of the comparing unit and increasing a voltage level of the driving power.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
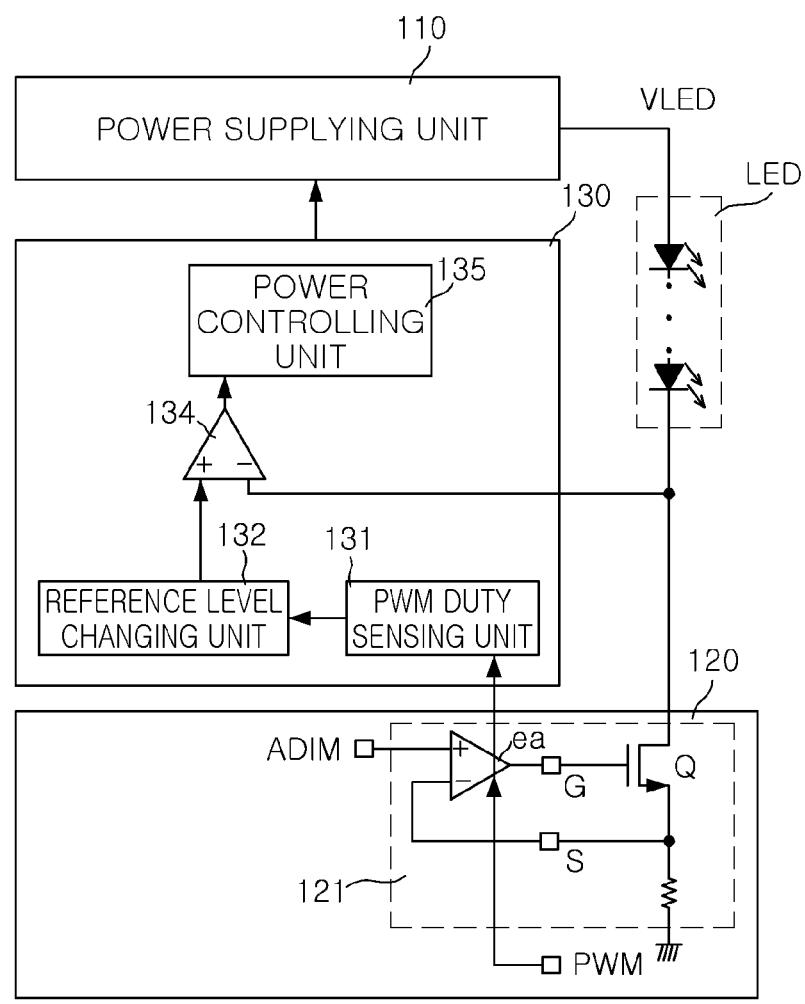
FIG. 1 is a view schematically showing a configuration of a light emitting diode (LED) driving apparatus according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Throughout the drawings, the same reference numerals will be used throughout to designate the same or like elements.

Figure 2:
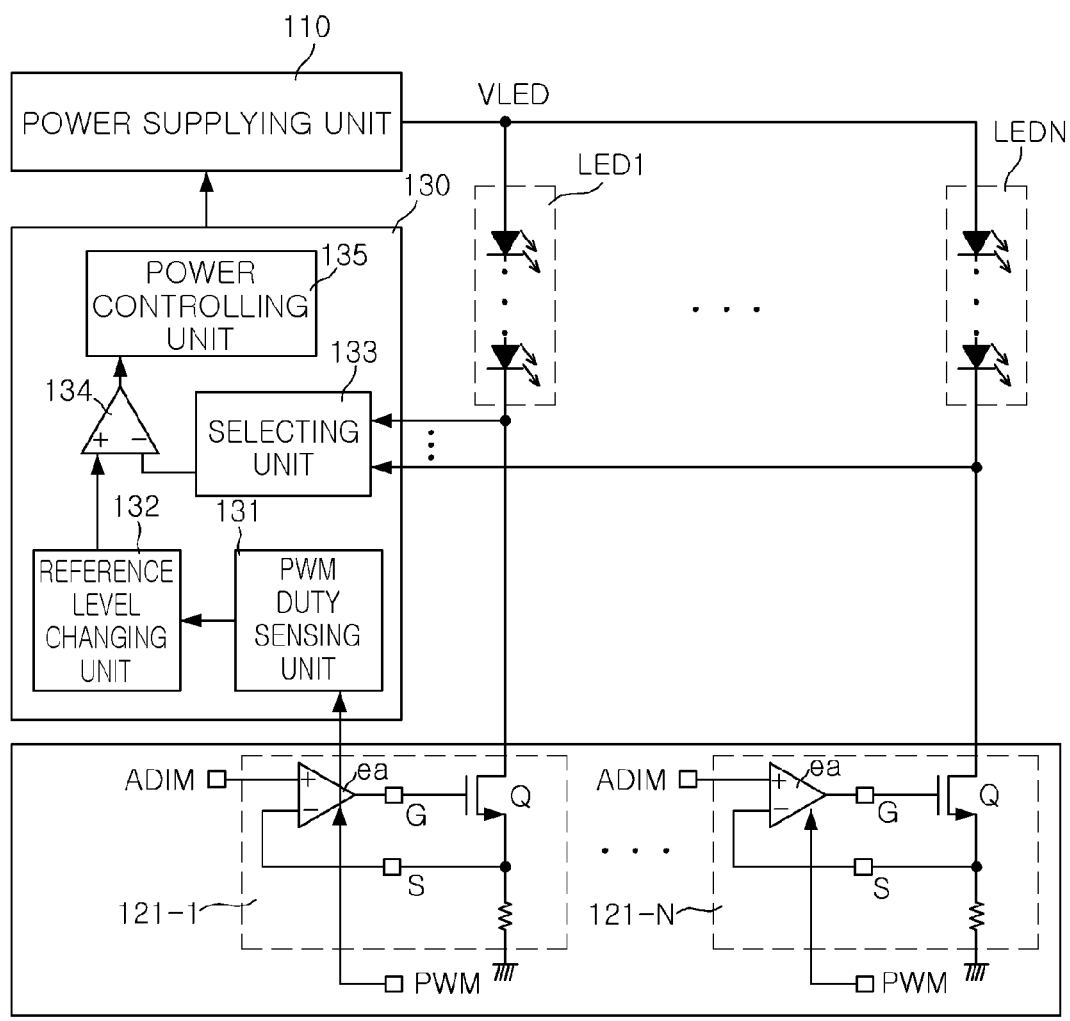
FIG. 2 is a view schematically showing main units of the light emitting diode driving apparatus shown in FIG. 1.

FIGS. 1 and 2 are views schematically showing a configuration of a light emitting diode (LED) driving apparatus according to an embodiment of the present invention.

Referring to FIGS. 1 and 2, a light emitting diode driving apparatus 100 according to the embodiment of the present invention may include a power supplying unit 110, a driving unit 120, and a controlling unit 130.

The power supplying unit 110 may convert input power into driving power VLED according to control to thereby supply the converted driving power VLED to at least one light emitting diode channel LED and may supply the converted driving power VLED to a plurality of light emitting diode channels LED1 through LEDN connected to each other in parallel as shown in FIG. 2.

Each of the plurality of light emitting diode channels LED1 through LEDN may include at least one light emitting diode or may include a plurality of light emitting diodes connected to each other in series.

The driving unit 120 may include a driver 121 having a switch Q and a comparator ea in order to control current flowing in at least one light emitting diode channel LED. As shown in FIG. 2, the driving unit 120 may include a plurality of drivers 121-1 through 121-N corresponding to the plurality of light emitting diode channels LED1 through LEDN, respectively, and each of first through N-th drivers, being in one-to-one correspondence with first through N-th light emitting diode channels LED1 through LEDN, respectively, may include the switch Q and the comparator ea.

The switch Q of the driver 121 and the first through N-th drivers 121-1 through 121-N, may be respectively connected between an end of the corresponding light emitting diode channel and a ground and may be switched on and off according to a switching signal to thereby control the current flowing in the light emitting diode channel, whereby brightness of the light emitting diode may be controlled.

The comparator ea of the driver 121 and the first through N-th drivers 121-1 through 121-N, may respectively compare a dimming signal ADIM input from the outside and the current flowing in the switch Q with a detection voltage detected by a resistor and may control the switching on and off of the switch Q depending on the comparison result.

Here, the comparator ea may have preset on/off duties and may receive a PWM dimming signal PWM transmitted from the outside. Here, the on/off duties of the PWM dimming signal PWM may be applied at the time of switching the switch Q on, to thereby control the brightness of the light emitting diode channel.

The controlling unit 130 may include a PWM duty sensing unit 131, a reference level changing unit 132, a comparing unit 134, and a power controlling unit 135, and may further include a selecting unit 133 as shown in FIG. 2.

The PWM duty sensing unit 131 may sense the on/off duties of the PWM dimming signal PWM transmitted from the outside. The PWM duty sensing unit 131 may sense an on-duty or off-duty of the PWM dimming signal PWM, and transmit the sensed duty value to the reference level changing unit 132.

The reference level changing unit 132 may provide a reference level to the comparing unit 134 and the reference level may be changed according to the on/off duties of the PWM dimming signal PWM.

More specifically, the reference level changing unit 132 may compare the duty of the PWM dimming signal sensed by the PWM duty sensing unit 131 with a preset reference duty in order to determine whether the duty of the PWM dimming signal sensed by the PWM duty sensing unit 131 is shorter than or is equal to or longer than the preset reference duty and may change a value of the reference level according to the comparison result.

More specifically, the reference level changing unit 132 may increase the value of the reference level in the case in which the duty of the PWM dimming signal sensed by the PWM duty sensing unit 131 is shorter than the preset reference duty, and may maintain the existing value of the reference level in the case in which the duty of the PWM dimming signal sensed by the PWM duty sensing unit 131 is equal to or longer than the preset reference duty.

Here, the comparison may be based on the on-duty.

That is, the reference level changing unit 132 may increase the value of the reference level in the case in which the on-duty of the PWM dimming signal sensed by the PWM duty sensing unit 131 is shorter than the preset reference duty, and may maintain the existing value of the reference level in the case in which the on-duty of the PWM dimming signal sensed by the PWM duty sensing unit 131 is equal to or longer than the preset reference duty.

On the contrary, the comparison may be based on the off-duty. In this case, the reference level changing unit 132 may increase the value of the reference level in the case in which the on-duty of the PWM dimming signal sensed by the PWM duty sensing unit 131 is longer than the preset reference duty and may maintain the existing value of the reference level in the case in which the on-duty of the PWM dimming signal sensed by the PWM duty sensing unit 131 is equal to or shorter than the preset reference duty.

The comparing unit 134 may compare the detection voltage obtained by detecting the current flowing in the light emitting diode channel with the reference level from the reference level changing unit 132 and provide the comparison result to the power controlling unit 135.

Meanwhile, a plurality of light emitting diode channels LED1 through LEDN may be provided as shown in FIG. 2, and the detection voltage obtained by detecting the current flowing in the light emitting diode channel may be provided from the plurality of light emitting diode channels LED1 through LEDN, respectively.

Therefore, the selecting unit 133 may provide the comparing unit 134 with a minimum detection voltage having the lowest voltage value among the detection voltages obtained by detecting the currents flowing in the respective light emitting diode channels from the plurality of light emitting diode channels LED1 through LEDN.

The power controlling unit 135 may control a power supplying operation of the power supplying unit 110 according to the comparison result of the comparing unit 134. Specifically, the power controlling unit 135 may control the voltage level of driving power VLED supplied to the light emitting diode channel from the power supplying unit 110.

More specifically, in the case in which the on-duty of the PWM dimming signal sensed by the PWM duty sensing unit 131 is shorter than the preset reference duty, the voltage level of the driving power (VLED) is increased by the increased value of the reference level, while in the case in which the on-duty of the PWM dimming signal sensed by the PWM duty sensing unit 131 is equal to or longer than the preset reference duty, the existing value of the reference level is maintained, such that the existing voltage level of the driving power VLED may be maintained.

Similarly, the foregoing operation is based on the on-duty of the PWM dimming signal. Alternatively, when being based on the off-duty of the PWM dimming signal, in the case in which the off-duty of the PWM dimming signal sensed by the PWM duty sensing unit 131 is longer than the preset reference duty, the voltage level of the driving power (VLED) is increased by the increased value of the reference level, while in the case in which the off-duty of the PWM dimming signal sensed by the PWM duty sensing unit 131 is equal to or shorter than the preset reference duty, the existing value of the reference level is maintained, such that the existing voltage level of the driving power VLED may be maintained.

Figure 3:
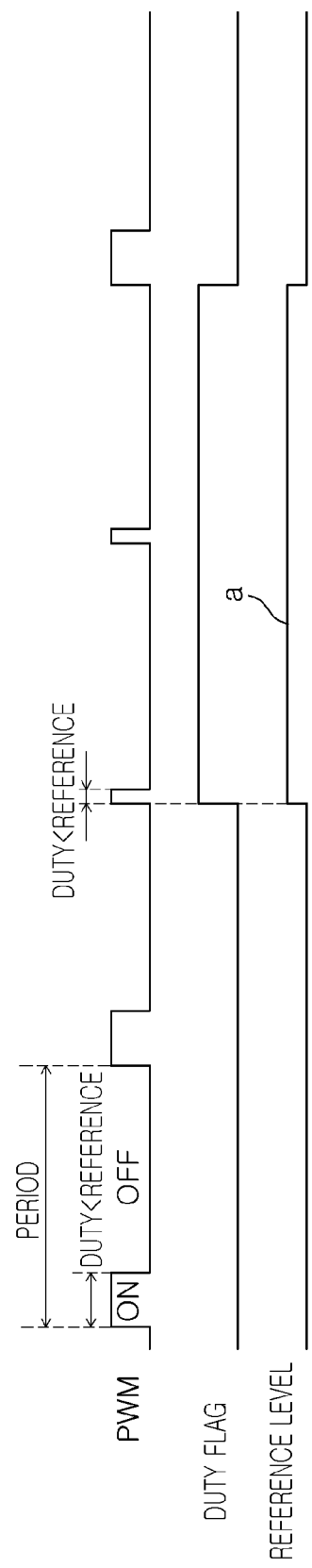
FIG. 3 is a graph of an operation waveform of main units of the light emitting diode driving apparatus shown in FIGS. 1 and 2.

FIG. 3 is a graph of an operation waveform of main units of the light emitting diode driving apparatus shown in FIGS. 1 and 2.

Referring to FIGS. 1 through 3, based on the on-duty of the PWM dimming signal, in the case in which the on-duty of the PWM dimming signal sensed by the PWM duty sensing unit 131 is equal to or longer than the preset reference duty, a duty flag from the PWM duty sensing unit 131 may be output at a low level to thereby maintain the existing value of the reference level, while in the case in which the on-duty of the PWM dimming signal sensed by the PWM duty sensing unit 131 is shorter than the preset reference duty, the duty flag from the PWM duty sensing unit 131 may be output at a high level to thereby increase the value (referring to reference sign 'a' in FIG. 3) of the reference level.

As described above, according to the embodiment of the present invention, at the time of the PWM dimming control of the LED channel, in the case in which the duty of the PWM dimming signal is lower than the reference duty, the reference level is changed to increase the output voltage, while in the case in which the duty of the PWM dimming signal is equal to or higher than the reference duty, the reference level is maintained to maintain the output voltage, such that the voltage allowing the switch configured as a transistor to be operated in the saturation region is ensured, whereby the light emitting diode may be stably operated.

As set forth above, according to embodiments of the present invention, a light emitting diode may be stably operated by changing a reference level in the case in which a PWM duty is low at the time of controlling PWM dimming.

While the present invention has been shown and described in connection with the embodiments, it will be apparent to those skilled in the art that modifications and variations can be made without departing from the spirit and scope of the invention as defined by the appended claims.

What is claimed is:
1. A light emitting diode driving apparatus, comprising:
a power supplying unit converting input power into driving power according to control and supplying the converted driving power to a light emitting diode channel;

a driving unit controlling current flowing in the light emitting diode channel according to a pulse width modulation (PWM) dimming signal from the outside; and a controlling unit comparing a reference level set by a duty of the PWM dimming signal with a detection voltage level of the light emitting diode channel and controlling a power converting operation of the power supplying unit according to the comparison result, wherein the controlling unit includes:
- a PWM duty sensing unit sensing the duty of the PWM dimming signal;
- a reference level changing unit changing the reference level when the duty of the PWM dimming signal sensed by the PWM duty sensing unit is shorter than a preset reference duty;
- a comparing unit comparing the reference level from the reference level changing unit with the detection voltage level of the light emitting diode channel; and
- a power controlling unit controlling the power converting operation of the power supplying unit according to the comparison result of the comparing unit, wherein the light emitting diode channel comprises a plurality of light emitting diode channels connected to each other in parallel, wherein the driving unit includes a plurality of drivers corresponding to the plurality of light emitting diode channels, respectively, and wherein each of the plurality of drivers includes:
- a switch connected between an end of the corresponding light emitting channel and a ground and controlling the current flowing in the light emitting diode channel according to a switching signal; and
- a comparator comparing the PWM dimming signal from the outside with voltage obtained by detecting the current flowing in the switch and controlling a switching operation of the switch.

2. The light emitting diode driving apparatus of claim 1, wherein the controlling unit changes the reference level when the duty of the PWM dimming signal is equal to or shorter than a preset reference duty.

3. The light emitting diode driving apparatus of claim 1, wherein the controlling unit further includes a selecting unit selecting one of respective detection voltages of the plurality of light emitting diode channels.

4. The light emitting diode driving apparatus of claim 3, wherein the selecting unit selects a minimum detection voltage among the detection voltages of the plurality of light emitting diode channels.

5. The light emitting diode driving apparatus of claim 1, wherein the PWM dimming signal has on/off-duties applied when the switch is switched on.

6. The light emitting diode driving apparatus of claim 2, wherein the controlling unit maintains an existing reference level when the duty of the PWM dimming signal is equal to or longer than the preset reference duty.

* * * * *